(12) United States Patent
Gilliland

(10) Patent No.: US 6,226,395 B1
(45) Date of Patent: *May 1, 2001

(54) METHOD AND APPARATUS FOR DETERMINING THE CONFIGURATION OF A WORKPIECE

(76) Inventor: Malcolm T. Gilliland, 310 Pine Valley Rd., Marietta, GA (US) 30067

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,949

(22) Filed: Apr. 1, 1997

Related U.S. Application Data (60) Provisional application No. 60/017,129, filed on Apr. 22, 1996, and provisional application No. 60/016,805, filed on Apr. 30, 1996.

(51) Int. Cl.[7] .................................................. G06K 9/00
(52) U.S. Cl. ............................ 382/152; 382/141; 348/90
(58) Field of Search .................................... 382/106, 108, 382/141, 153, 154, 312, 318, 319, 322; 348/86, 90, 91, 94, 42, 47; 358/474

(56) References Cited

U.S. PATENT DOCUMENTS

| | | | |
|---|---|---|---|
| 4,731,853 | * | 3/1988 | Hata et al. ............................ 382/154 |
| 4,835,450 | * | 5/1989 | Suzuki ................................. 382/154 |
| 4,982,438 | * | 1/1991 | Usami et al. ......................... 382/154 |
| 5,046,852 | * | 9/1991 | Hametner et al. .................... 382/319 |
| 5,198,876 | * | 3/1993 | Anezaki et al. ...................... 382/154 |
| 5,249,035 | * | 9/1993 | Yamanaka ............................ 382/154 |
| 5,285,397 | * | 2/1994 | Heier et al. .......................... 382/318 |

* cited by examiner

Primary Examiner—Bhavesh Mehta
(74) Attorney, Agent, or Firm—Troutman Sanders LLP; Charles L. Warner (57) ABSTRACT

The present invention provides a method and an apparatus for scanning an object to obtain data on the object and determine the configuration of the object. A gantry (12) allows movement along a first direction (A–A'). A set of platforms (14A, 14B) allows movement along a second direction (B–B'). A set of scanning heads (16A, 16B) provide additional degrees of freedom and also provide for scanning the object (10) to obtain information about the object. The freedom of movement provided by the gantry, the platforms, and the scanning heads allows the object to be completely scanned. In addition, once the initial scanning process has been completely, areas which require additional scanning, such as compartments (10D), are identified. The scanning heads are then positioned, such as directly above or inside a compartment, and then the compartment is scanned to obtain information about the compartment that could not be obtained from the initial scanning procedure. The data obtained from the initial scan and any subsequent scans is processed to determine the configuration of the object. The information concerning the configuration is then used to perform a welding, cutting or other operation on the object.

6 Claims, 10 Drawing Sheets

Fig_4

Fig_5

METHOD AND APPARATUS FOR DETERMINING THE CONFIGURATION OF A WORKPIECE

CROSS REFERENCE TO RELATED APPLICATION

This application claims the priority of U.S. Provisional Patent Application No. 60/017,129, filed Apr. 22, 1996, and U.S. Provisional Patent Application No. 60/016,805, filed Apr. 30, 1996.

TECHNICAL FIELD

This invention relates to robotic welding systems and, more particularly, discloses a method and an apparatus for determining the configuration of a workpiece so that a robot welder will have the proper coordinates for the welding operation.

BACKGROUND OF THE INVENTION

Robotic, or automatic, welders accurately perform welding operations which would be difficult and/or time consuming if performed by a human. Human welders can visually perceive the area of the welding operation, the location of the elements to be welded, and compensate for the misalignment of the elements. However, robotic welders do not have such intelligence and need information about the workpiece, such as the coordinates of the elements to be welded, any elements which must be worked around, etc. This information is generally provided by a human, at least to some degree. For example, a human operator may, using manual controls, move the robotic welder sensing arm about the workpiece and instruct the robotic welder to store the coordinates of the bottom plate, an intersection of elements, a corner, etc. Also, the robotic welder can accept information about the ideal element locations from a computer assisted design (CAD) program which was used to draw the plans for the workpiece to be welded.

Elements may not be always placed in their "ideal" locations, they may be offset or skewed In many cases, this offset or skew does not affect the structural-integrity of the finished product as long as the offset or skew is within certain, usually generous, tolerances.

A robotic welder, especially one which has a "touch-sense" feature, can compensate for some offset or skew. However, if the offset or skew exceeds a certain amount then the robotic welder may start outside a compartment, rather than within it, and thereby perform the wrong welding operation.

Therefore, there is a need for a method which accurately determines the locations of the elements, as placed, so that the configuration of the workpiece will be accurately known by the robotic welder.

SUMMARY OF THE INVENTION

The present invention provides a method whereby the workpiece is automatically scanned to determine the precise location of the various elements. This information is then provided to the robotic welder so that the robotic welder will have exact information concerning the configuration of the workpiece and can flawlessly perform the programmed welding operation, even if the elements are not in the locations specified by the drawings for the workpiece.

The method of the present invention includes the steps of automatically scanning the workpiece from a plurality of locations to generate a three-dimensional picture of the workpiece, and then using this three-dimensional picture of the workpiece to obtain exact information regarding the location and orientation of each of the elements.

By scanning the workpiece from a plurality of locations (observation points) the present invention eliminates shadowing and other problems that may occur when one element conceals another element when viewed from a single observation point. Thus, even though a larger element may completely conceal a smaller element when the workpiece is viewed from a first observation point, the smaller element will be detected and its coordinates and other information obtained when the workpiece is viewed from a second observation point.

The present invention provides a method for determining the configuration of an object. The method includes the steps of setting a first position, scanning the object from the first position to a second position to obtain data on the object, setting a next position, scanning the object from the next position to a subsequent position to obtain additional data on the object, repeating the steps of setting the next position and scanning from the next position to the subsequent position to obtain additional data on the object until the desired portion of the object has been scanned, and processing the data to determine the configuration of the object. The configuration is then provided to a subsequent process.

Another method for determining the configuration of an object includes the steps of scanning the object in a first manner to obtain data on the object, scanning the object in a second manner to obtain additional data on the object, and processing the data to determine the configuration of the object. The configuration is then provided to a subsequent process.

Another method for determining the configuration of an object includes the steps of scanning the object in a linear manner to obtain data on the object, identifying areas of the object for which additional data is needed, scanning the areas to obtain the additional data, and processing the data and the additional data to determine the configuration of the object. The configuration is then provided to a subsequent process.

The present invention also provides an apparatus for determining the configuration of an object. The apparatus has scanning means for scanning the object to obtain data on the object, first means for moving the scanning means along a first path, second means for moving the scanning means along a second path, and a control means. The control means for controls the operation of the scanning means, the first means, and the second means, receives the data from the scanning means, and processes the data to determine the configuration of the object. The control means then provides the configuration to another apparatus for use in a subsequent operation, such as a welding operation, or uses the configuration to perform a subsequent operation.

Another apparatus has scanning means for scanning the object to obtain data on the object, first means for moving the scanning means along a first path, second means for moving the scanning means along a second path, and a control means. The control means controls the operation of the scanning means, the first means, and the second means, receives the data from the scanning means, processes the data to determine areas of the object for which additional data is needed, controls the operation of the scanning means, the first means, and the second means to obtain the additional data, and processes the data and the additional data to determine the configuration of the object. The control means then provides the configuration to another apparatus for use in a subsequent operation, such as a welding operation, or uses the configuration to perform a subsequent operation.

Another apparatus includes scanning means for scanning the object to obtain data on the object, first means for moving the scanning means along a first linear path, second means for moving the scanning means along a second linear path orthogonal to the first linear path, and a control means. The control means controls the operation of the scanning means, the first means, and the second means, receives the data from the scanning means, and processes the data to determine the configuration of the object. The control means then provides the configuration to another apparatus for use in a subsequent operation, such as a welding operation, or uses the configuration to perform a subsequent operation.

The present invention also provides a method for determining the configuration of an object. The method includes the steps of scanning the object to obtain a set of data points for the object, inspecting the set of data points to define a first plane and a second plane, determining an intersection line for the first plane and the second plane, and specifying the intersection line by a starting point and an ending point. The first plane comprises a first plurality of the data points and the second plane comprises a second plurality of the data points. The first plurality and the second plurality are smaller than the set and are part of the set.

Another method for determining the configuration of an object includes the steps of scanning the object to obtain a set of data points for the object, inspecting the set of data points to define a first plane and a second plane, determining an intersection line for the first plane and the second plane, determinating whether the intersection line is a straight line or is a curved line. If the intersection line is a straight line, then the intersection line is specified by a starting point and an ending point. If the intersection line is a curved line then the intersection line is specified by a plurality of points. The first plane comprises a first plurality of the data points and the second plane comprises a second plurality of the data points. The first plurality and the second plurality are smaller than the set and are part of the set.

The step of specifying the plurality of points for the intersection line if the intersection line is a curved line comprises selecting a first point and a second point for the intersection line, defining a straight line by the first point and the second point, defining a desired curved line by the first point, the second point, and points on the intersection line between the first point and the second point, determining a maximum difference between the straight line and the desired curved line, if the maximum difference is greater than a predetermined amount then selecting a different second point and repeating these steps until the maximum difference is not greater than the predetermined amount, and, when the first point and the second point have been selected such that the maximum difference is not greater than the predetermined amount, then storing the first point and the second point and, using the second point as a next first point, repeating these steps until the plurality of points for the intersection line have been selected. The first point and the second point are points on the intersection line and are separated by a first distance, and the different second point is separated from the first point by less than the first distance.

The present invention also provides an apparatus for determining the configuration of an object. The apparatus includes scanning means for scanning the object to obtain data on the object, first means for moving the scanning means along a first path, second means for moving the scanning means along a second path, and a controller. The controller controls the operation of the scanning means, the first means, and the second means. The controller also receives the data from the scanning means, processes the data to define a first plane and a second plane, determines an intersection line for the first plane and the second plane, and specifies the intersection line by a starting point and an ending point.

Another apparatus for determining the configuration of an object also includes scanning means for scanning the object to obtain data on the object, first means for moving the scanning means along a first path, second means for moving the scanning means along a second path, and a controller. The controller again controls the operation of the scanning means, the first means, and the second means. The controller also receives the data from the scanning means, processes the data to define a first plane and a second plane, and determines an intersection line for the first plane and the second plane. However, the controller then determines whether the intersection line is a straight line or is a curved line, and, if the intersection line is a curved line, specifies a plurality of points for the intersection line.

Another apparatus for determining the configuration of an object also includes scanning means for scanning the object to obtain data on the object, first means for moving the scanning means along a first path, second means for moving the scanning means along a second path, and a controller. The controller again controls the operation of the scanning means, the first means, and the second means, receives the data from the scanning means, processes the data to define a first plane and a second plane, determines an intersection line for the first plane and the second plane, and determines whether the intersection line is a straight line or is a curved line. Then, if the intersection is a curved line, the controller selects a first point and a second point for the intersection line, the first point and the second point being points on the intersection line and being separated by a first distance, defines a direct line by the first point and the second point, defines a desired curved line by the first point, the second point, and points on the intersection line between the first point and the second point, determines a maximum difference between the direct line and the desired curved line, selects a different second point if the maximum difference is greater than a predetermined amount, the different second point being separated from the first point by less than the first distance, until said maximum difference is not greater than said predetermined amount, and then for storing said first point and said second point, for using said second point as a next said first point, and for defining additional direct lines until said plurality of points for said intersection line have been selected.

Thus, the present invention provides a method and an apparatus for automatically scanning an object, determining the configuration of the object, and performing an operation upon the object based upon this configuration.

Other objects, features, and advantages of the present invention will become apparent upon reading the following description of the preferred embodiment, when taken in conjunction with the drawings and the claims.

DETAILED DESCRIPTION OF THE INVENTION

Figure 1:
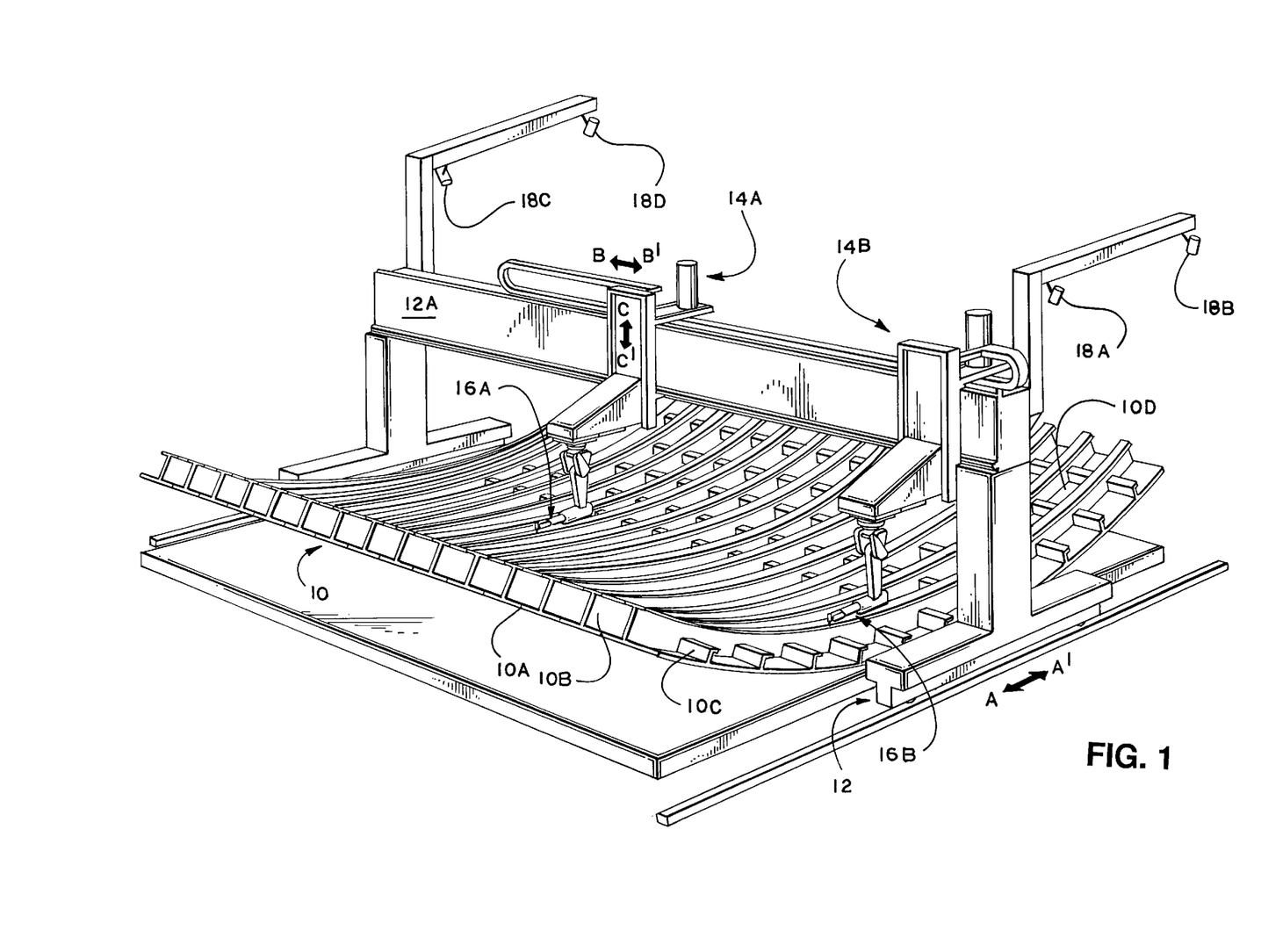
FIG. 1 is an illustration of the preferred embodiment of the present invention.

FIG. 1 is an illustration of the preferred embodiment of the present invention. A workpiece 10 is shown. The workpiece 10 comprises a plurality of elements, such as a bottom plate 10A, a plurality of larger transverse I-beams 10B, a plurality of smaller longitudinal I-beams 10C, and a plurality of compartments 10D. It will be appreciated that the elements 10B, 10C cooperate to form compartments 10D. Further, in the illustration, it will be noted that the workpiece 10 is not a flat object, but is curved.

A gantry 12 provides movement along path A–A'. Thus, the gantry 12 can move transversely with respect to the workpiece 10. Two movable platforms 14A, 14B are mounted on the beam 12A of the gantry 12. These platforms provide movement along path B–B' so that the platforms 14A, 14B can move longitudinally with respect to the workpiece 10. These platforms also provide vertical movement along path C–C' so that the heads 16A, 16B can be raised or lowered as necessary to inspect the workpiece 10, to avoid collision with the workpiece 10, or to perform a welding or other operation on the workpiece 10. The heads 16A, 16B are connected to the platforms 14A, 14B, respectively. The heads 16A and 16B preferably include both scanning devices and welding devices, not shown separately. The scanning device and the welding device in a head 16A, 16B may be independently operable or may be retracted or rotated so that the desired device is in operational position. In another embodiment, only one device is included in the head 16A, 16B and the devices (scanning device, welding device) are switched whenever necessary. For clarity of discussion hereinbelow, the heads 16A, 16B will be referred to primarily as scanning heads hereinafter.

The scanning heads 16A, 16B have several degrees of freedom, such as move linearly up/down, rotate clockwise/counterclockwise, rotate up/down, extend/retract linearly, etc. Thus, by movement of the gantry 12 along path A–A', by movement of the platforms 14A, 14B along paths B–B' and C–C', and by movement of the scanning heads 16A, 16B along their degrees of freedom, the scanning heads 16A, 16B can view each and every element of the workpiece 10 in detail and without any element being completely concealed by any other element. The platforms 14A, 14B may be physically connected and move in unison, or they may be independent and move as desired, taking care to avoid collision between them. In the preferred embodiment, the platforms 14A, 14B are physically connected and move in unison.

Scanning of the workpiece 10 may be done by any convenient procedure. For example, the gantry 12 may be positioned at a first point along path A–A', the platform 14A positioned at the outermost point (B) of path B–B', which causes the platform 14B to be positioned at the midpoint of path B–B', the scanning heads 16A, 16B pointed downward, and then the distance from the scanning heads 16A, 16B to the workpiece 10 measured as the platformis 14A, 14B are moved in the direction of B'. Then, the gantry 12 is positioned at a second point along path A–A', slightly to one side of the first point, and then the process of moving the platforms 14A, 14B is repeated. This procedure is repeated until the entire workpiece 10 has been scanned. This provides information concerning the location, height and curvature of the bottom plate 10A, the transverse I-beams 10B, and the longitudinal I-beams 10C.

However, scanning straight down does not provide information about whether the beams 10B, 10C or I-beams, inverted L-beams, or inverted U-beams, so the welding points (the points of contact between the beams 10B, 10C and the bottom plate 10A) are not yet known.

Therefore, the next stage in the scanning process is to rotate the scanning heads 16A, 16B up to a predetermined angle so that they can view the sides of the beams 10B, and then repeat the process. The scanning heads 16A, 16B can also be extended linearly to obtain the desired viewing angle because the heights of the workpiece elements have already been determined and therefore collision with the workpiece is easily avoided. The platforms 14A, 14B are moved in one direction, say B'. When the end of the path is reached then the scanning heads are rotated 180°, so as to view the opposite side of the elements 10B, and then the scanning process is repeated while the platforms 14A, 14B are moved in the opposite direction, B. Complete information is now known about the beams 10B.

Then, the scanning heads 16A, 16B are rotated clockwise/counterclockwise so that they can view the sides of the beams 10C, the platforms 14A, 14B are placed at a first point along path B–B', the gantry 10 placed at a first point along path A–A', say toward the A end of path A–A', and then the scanning process is repeated while the gantry 12 is moved, in this case in the direction of A'. Again, the scanning heads 16A, 16B can also be extended linearly to obtain the desired viewing angle because the heights of the workpiece elements have already been determined and therefore collision with the workpiece is easily avoided. When the end of the path is reached then the scanning heads are rotated 180°, so as to view the opposite side of the elements 10C, and then the scanning process is repeated while the gantry 12 is moved in the opposite direction, A. Then, the platforms 14A, 14B are positioned at a second point along path B–B', slightly to one side of the first point, and then the process of moving the gantry 12 is repeated. This procedure is repeated until the entire workpiece 10 has been scanned. Complete information is now known about the beams 10C.

This procedure thus provides accurate information concerning the location, height and curvature of the bottom plate 10A, the transverse I-beams 10B, and the longitudinal I-beams 10C.

If desired or necessary, additional information may be obtained by positioning a scanning head close to or even inside a compartment 10D. This is possible because information has already been obtained about the location of the compartments 10D because the location and positioning of the elements 10B, 10C have been determined.

Therefore, it is possible, by virtue of the present invention, to obtain complete information about the configuration of the workpiece 10. This information is then provided to the welding program which controls the robotic welders, and the welding program can then precisely position the robotic welders for the welding operation to be performed. Thus, errors in the CAD design information or in the positioning of the elements during assembly are of little or no consequence because the actual positions of the elements have been determined and the welding operations are performed using this actual position information.

For convenience of illustration, FIG. 1 shows only one gantry 12 and two platforms 14. However, it should be appreciated that more than one gantry may be used, and more than two platforms and scanning heads may be used, to obtain information more rapidly, provided that measures are taken to avoid collision between the several gantries and platforms.

The scanning may be performed by any device which can view an object and provide coordinate information on the various points on the object. Scanning may be performed, for example, by using analog or digital cameras, infrared laser transmitters and receivers, ultrasonic scanners, visual band laser transmitters and receivers, short wavelength radar systems, such as microwave radar, millimeter wave radar, and higher frequency radar, magnetic devices, etc. It should be appreciated that several devices may be used collectively to provide the desired information. For example, an analog or digital camera may provide X and Y coordinate information, and a laser or ultrasonic device may provide the ranging information, so that the devices collectively provide complete information about the object. The output of the device or devices may be communicated to the controller by any convenient means, such as analog or digital transmission, and via conventional or fiber optic cable. The device or devices used for scanning, in addition to providing X and Y coordinate information, should also provide ranging information to the various points on the object so that a complete three dimensional picture of the object (X coordinate of a point, Y coordinate of a point, and height a point) may be determined. An optical camera which provides a digitized representation of the scene is one example of a device which may be used to obtain information about the object. Once this three dimensional information has been obtained and processed to form an electronic representation of the object then the representation of the object may be rotated electronically so that the object, and the features of the object, may be viewed and from any desired angle. Computer programs for rotating three dimensional representations of objects are well known.

In some cases, very precise measurement information may be required. In these cases "targets", such as reflectors or mirrors, may be placed at specified points on the workpiece, such as the corners and upper and lower edges, so that the accuracy of the measurement sytems may be verified and a compensation factor determined for any offset or error.

Figure 2:
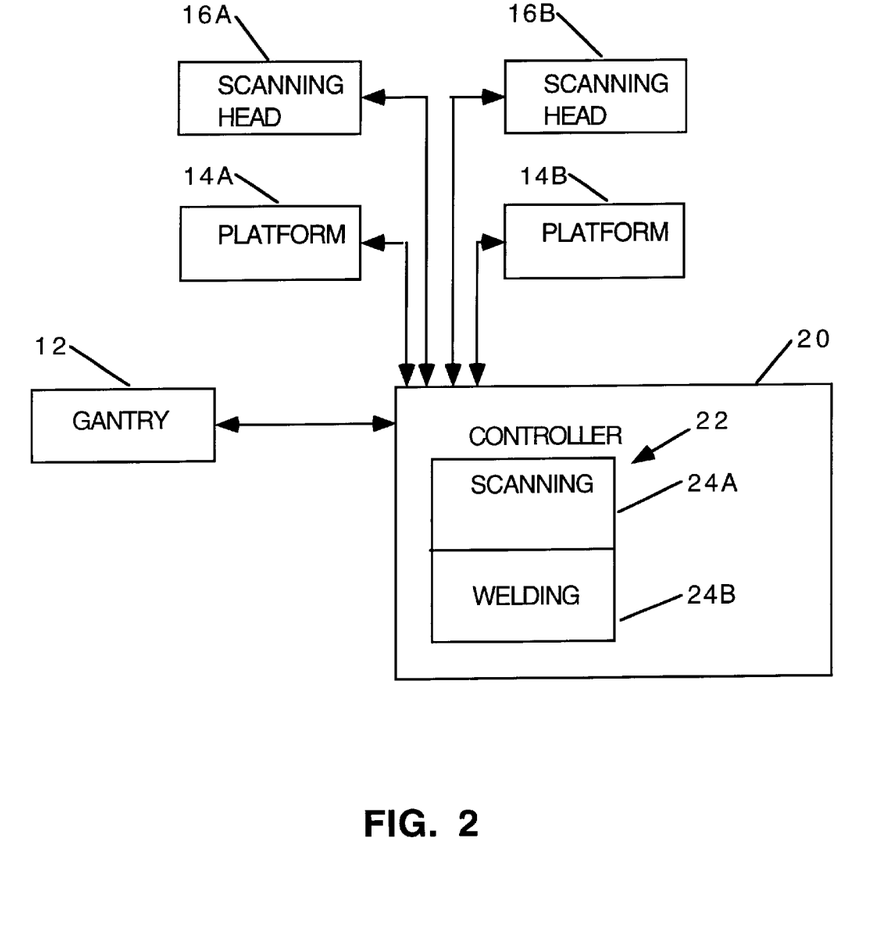
FIG. 2 is a block diagram of the present invention.

FIG. 2 is a block diagram of the present invention. A controller 20 controls the operation of system. The controller 20 performs two distinct operations: scanning and welding. A memory 22 has a first program section 24A which contains programming instructions for the scanning operation, and a second program section 24B which contains programming instructions for the welding operation. Preferably, the program section 24A concerned with scanning also interprets the scanning data to provide the information needed for the program section 24B. The scanning process is described herein. The process of interpreting data from a scan to produce an image or a three-dimensional model of the object which has been scanned is well known, such as in magnetic resonance imaging, CAT scans, synthetic aperture radar, etc. The process of welding based upon information about the configuration of a workpiece is described in U. S. Patent Application No. 08/368,705, filed Jan. 4, 1995, entitled "Method for Simultaneous Operation of Robot Welders". Other procedures may also be used.

The controller 20 is connected to the gantry 12, sends positioning instructions to the gantry 12, and receives positioning information or position confirmation from the gantry 12. Thus, the controller controls the gantry 12 and knows the exact location of the gantry 12 at all times. The controller 20 is also connected to the platforms 14A and 14B, sends positioning instructions to the platforms 14A and 14B, and receives positioning information or position confirmation from the platforms 14A and 14B. Thus, the controller 20 controls the platforms 14A and 14B and knows the exact location of the platforms 14A and 14B at all times. The controller 20 is also connected to the scanning heads 16A and 16B, sends positioning instructions to the scanning heads 16A and 16B, and receives positioning information or position confirmation from the scanning heads 16A and 16B. Thus, the controller 20 controls the scanning heads 16A and 16B and knows the exact location of the scanning heads 16A and 16B at all times. The controller 20 also sends scanning instructions to the scanning heads 16A and 16B and receives the scanned data information from the scanning heads 16A and 16B. The controller 20 knows the exact position of the gantry 12, the exact position of the platforms 14A and 14B, and the exact position of the scanning heads 16A and 16B, so the controller 20 also knows the exact position on the object (workpiece 10) which the scanning data describes. The determination of the exact position of each reflection point, based upon the positions of the gantry, platforms, and scanning heads is referred to herein as registration. Therefore, the controller 20 constructs an image or model of the object based upon the scanning data and the position information.

In an alternative embodiment, there is a single scanning head 16, which may be any of the scanning heads, and the scanning head is non-movable. That is, the scanning head is at a fixed location but can be rotated left/right and up/down. In this embodiment all of the measurements are taken from a single position, so the positions of the gantry, platforms, and scanning head is fixed and does not vary, and so registration of the position information for each reflection point is not required. Rather, the angular information (left/right and up/down) for the scanning head and the distance to the reflection point are used, without more, to determine the position of the reflection point relative to the scanning head. This provides less information but may be adequate for some purposes, such as where the configuration of the workpiece is simple, or where the controller will only perform welding operations on the side which is viewed by the scanning head. In another alternative embodiment, there is a single, fixed scanning head, but a carriage (not shown) is used to position the workpiece and the exact position of the carriage is measured. Thus, the workpiece may be shifted linearly or may be rotated, as desired, to obtain the necessary views and obtain the desired amount of information. In other alternative embodiments, multiple scanning heads may be used with either of these two alternative embodiments.

Figure 3:
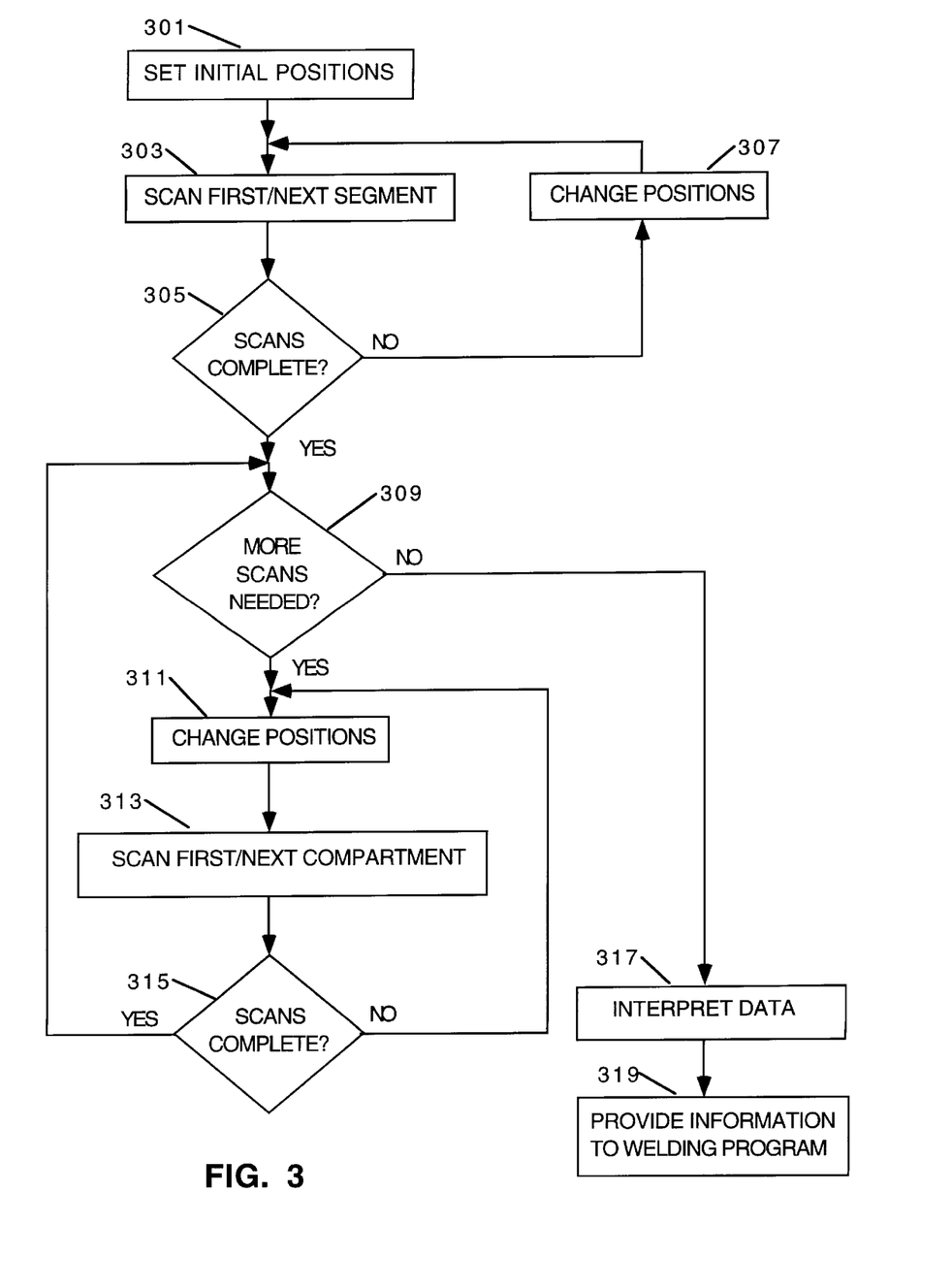
FIG. 3 is a flow chart illustrating the process of the present invention.

FIG. 3 is a flow chart illustrating the process of the present invention. The first step 301 is to set the initial positions for the gantry 12, the platforms 14A and 14B, and the scanning heads 16A and 16B. If the workpiece 10 is on a movable table (not shown) then the workpiece 10 is also moved to its initial position.

In step 303 the first segment of the workpiece is scanned. In the preferred embodiment, scanning is performed on a segment-by-segment linear basis, as described above. However, other scanning procedures, such as spirals, may be used if desired.

In step 305 the controller 20 determines whether the first set of scans (linear scans) has been completed. If not, then in step 307 the controller changes the position of the appropriate device or devices (gantry 12, platform 14A, 14B, scanning head 16A, 16B) and then returns to step 303 to scan the next segment.

If, in step 305, the first set of scans has been completed then, in step 309, the controller 20 determines whether additional sets of scans are needed. This determination may be made simply, as where the controller 20 is programmed to perform two or more scans unconditionally, or may be made based upon the results of the previous set or sets of scan data.

For example, the controller 20 may process the data from the first set of scans and detect abrupt differences in height data, which indicate that compartments are present. In this case the controller 20 determines that an additional set of scans is needed. More particularly, the interiors of the compartments must be scanned to determine the configuration of the compartments. Controller 20 will then position the appropriate device or devices to provide for scanning the interiors of the compartments. Each compartment may be scanned, or the scanning program 24A may provide that the compartments are grouped according to some characteristic, such as width, length or depth, and only one compartment from each group is scanned, or a representative sample of compartments from each group is scanned, to provide a representative configuration for the compartments in a group.

If, in step 309, one or more additional sets of scans are required then, in step 311, the controller 20 changes the position of the appropriate device or devices. In step 313 the next set of scans is started. In the preferred embodiment, step 313 is to scan the first compartment.

In step 315 the controller 20 determines whether this set of scans (compartment scans) has been completed. If not then the controller 20 returns to step 311, changes the position of the appropriate device or devices, and performs the next scan in step 313.

If, in step 315, this set of scans has been completed then a return is made to step 309 to determine if another set of scans is needed. If so then step 311 is executed.

If no additional sets of scans are needed in step 309 then, in step 317, the controller 20 completes the interpretation of the data and, in step 319, the controller 20 furnishes the interpreted information to the welding process.

Once the information has been sent to the welding process the scanning process has been completed. At this point, if necessary, the scanning heads may be retracted, rotated, or replaced, so that the welding heads are in position. The welding process is then initiated.

Returning to FIG. 1, another embodiment of the present invention will be described. In this embodiment scanning heads 18A, 18B, 18C, and 18D are used, collectively referred to as heads 18. Four heads 18 are shown for convenience but fewer heads 18 may be used to provide for a simpler system, or more heads 18 may be used to provide for faster scanning. The heads 18 are preferably mounted on the gantry 12 so that they may be moved along A–A' to scan the entire workpiece 10. In one version the heads 18 have a sufficiently broad field of view that the plurality of heads 18 provide full coverage of the workpiece 10. In another version, the heads 18 are mounted on the platforms 14A, 14B so that movement along both A–A' and B–B' is provided. This allows scanning heads 18 with a narrower field of view to be used. These embodiments are particularly useful in cases where one or another of the heads 18 has a clear view of the important aspects of the object and there is no need for the agility provided by the scanning heads 16A, 16B. Examples of such cases are where there are no compartments, and where the walls of a compartment or the various parts of the workpiece do not conceal or shadow any areas on which an operation is to be performed.

The sequence of operation described above, completely scanning the workpiece and then performing the welding or other operation, is a preferred method of operation but the present invention is not so limited. In another embodiment of the present invention, the scanning operation and the desired operation are performed essentially simultaneously. In this embodiment, an area is scanned and then the desired operation is performed on that area, then the next area is scanned, and so on. For example, the scanning heads 18 are used to scan a first area and a second area of the workpiece 10, the information on the first area is processed, and the desired operation is commenced on the first area. While the desired operation is being performed on the first area, the information on the second area is being processed. When the operation on the first area is completed, a third area is scanned and then the desired operation on the second area is commenced while the information on the third area is being processed, and so on.

Figure 4:
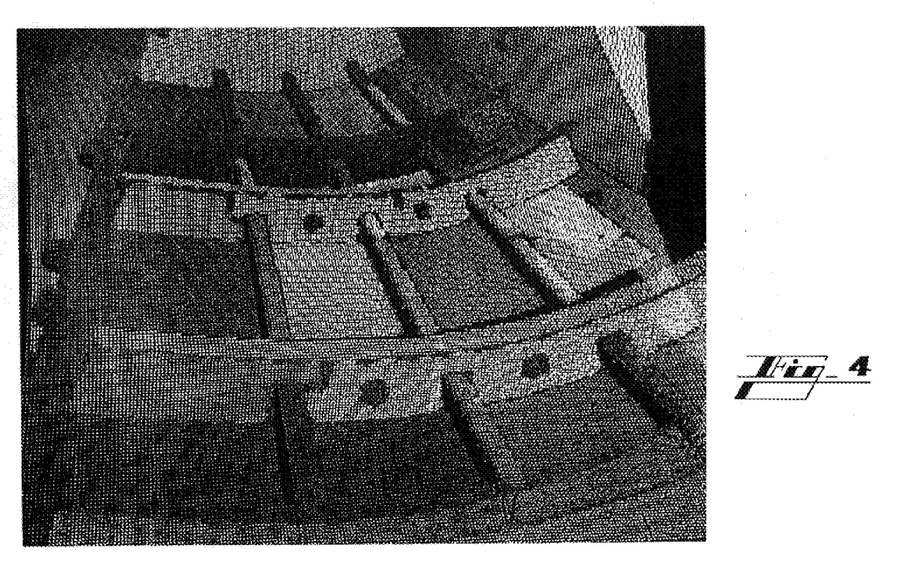
FIG. 4 is an example of a workpiece as "seen" by a laser scanning system.

FIG. 4 is an example of a workpiece as "seen" by a laser scanning system. The different shading of the various reflection points is provided solely for ease of viewing and does not represent the magnitude of a return from a reflection point. Consider the workpiece 10 of FIG. 1, and assume that the controller 20 causes the workpiece 10 to be scanned looking at a right angle to line A–A', that is, scanned looking along line B–B'. The controller 20 will cause a scanning head, such as scanning head 16B, to emit a laser pulse, detect the reflected return (echo) signal, and use the echo delay to calculate the distance. Thus, the distance from the laser head to the reflection point is measured. For each pulse, the controller 20 will record the position along line A–A', the position along line B–B', and the parameters of the degrees of freedom of the scanning head 16B, such as the up/down position, the clockwise/counterclockwise rotatation, the up/down rotatation, the extend/retract position, etc. The controller 20 will also record the measured distance from the laser head to the reflection point. Preferably, the controller 20 records this information for each reflection point.

The contoller 20 then uses this information to calculate the exact position of each reflection point. The position may be recorded as X, Y, Z axis position information, or may be recorded using other coordinate systems, as desired and as convenient for the workpiece involved. The controller 20, depending upon its processing power, may determine the exact position for each point as the scanning process is proceeding and the information is collected for each reflection point, or may determine the exact positions for all of the reflection points after the scanning process has been completed and data has been collected for all desired points.

Once the position of each point has been determined, the controller 20 then inspects the position information to determine the configuration of the workpiece. A reflection point which, with respect to it neighbors, is adjacent in one dimension but the same in two dimensions (for example, same X and Z positions, adjacent Y positions), represents a plane in the X, Y, or Z dimension, such as part of the surface of a component of the workpiece, such as the top or the side of a beam 10. A reflection point which, with respect to its neighbor, is adjacent in two dimensions but the same in one dimension (for example, same X positions, adjacent Y and Z positions), or is adjacent in all three dimensions, represents a plane such as the surface of a component which is tilted or angled, or the surface of a component which is curved. A reflection point which, with respect to any one of its neighbors, is not either adjacent or identical in all three dimensions, that is, is non-adjacent and non-identical in at least one dimension, represents a discontinuity, which indicates an edge of a component. Also, the intersection of two planes or surfaces represents the junction of two or more components. The common points of the intersection represents an intersection line which, in the present invention, may represent the intersection of the components to be welded.

Figure 5:
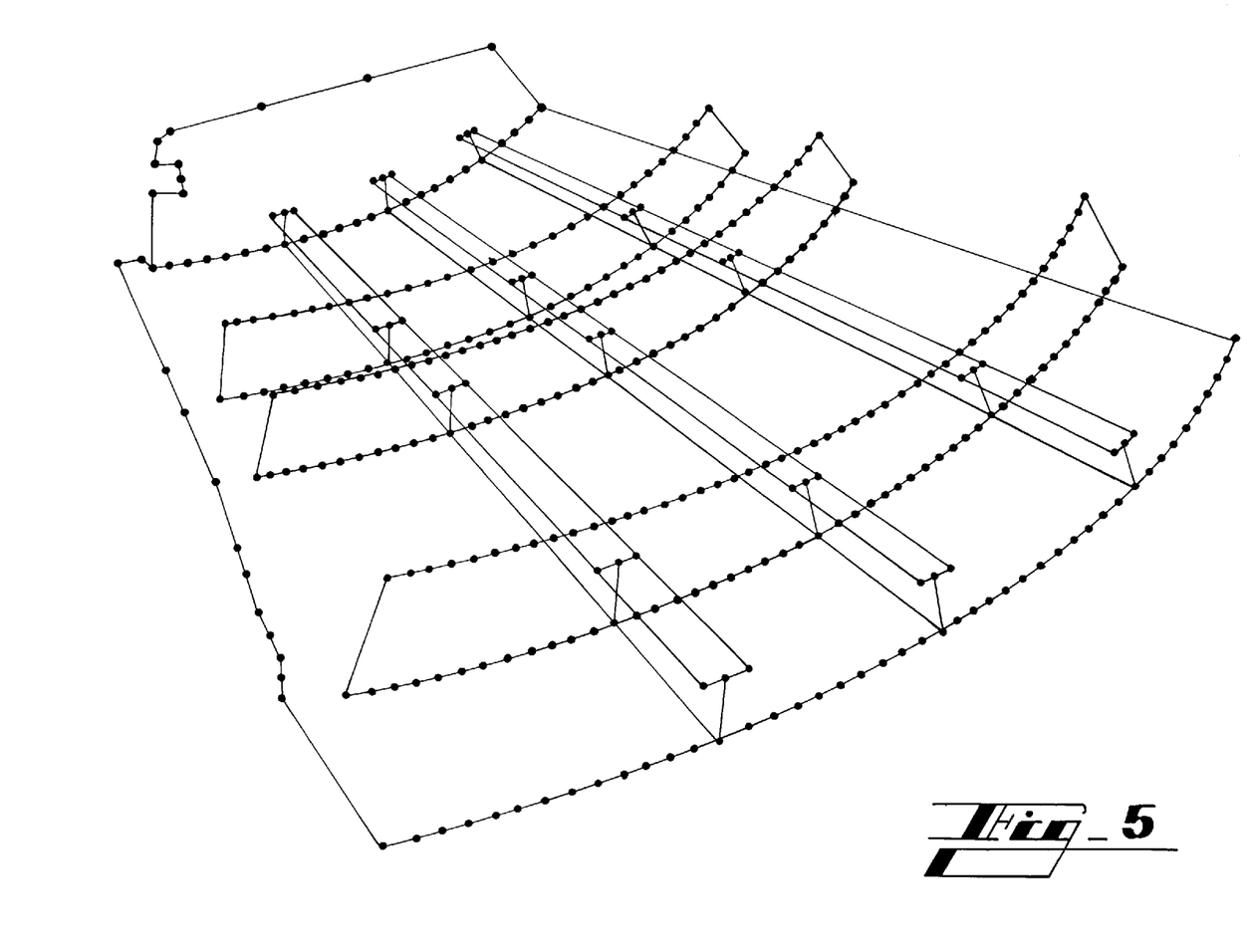
FIG. 5 illustrates an initial identification of the components represented by the reflection points of FIG. 4.

FIG. 5 illustrates an initial identification of the components represented by the reflection points of FIG. 4. FIG. 5 is a simplified view and does not show all of the reflection points used to identify the components. It will be seen from FIG. 5 that the general shape, position, and orientation of the components has been determined. Further processing of the reflection points generates more details regarding the components.

Figure 6:
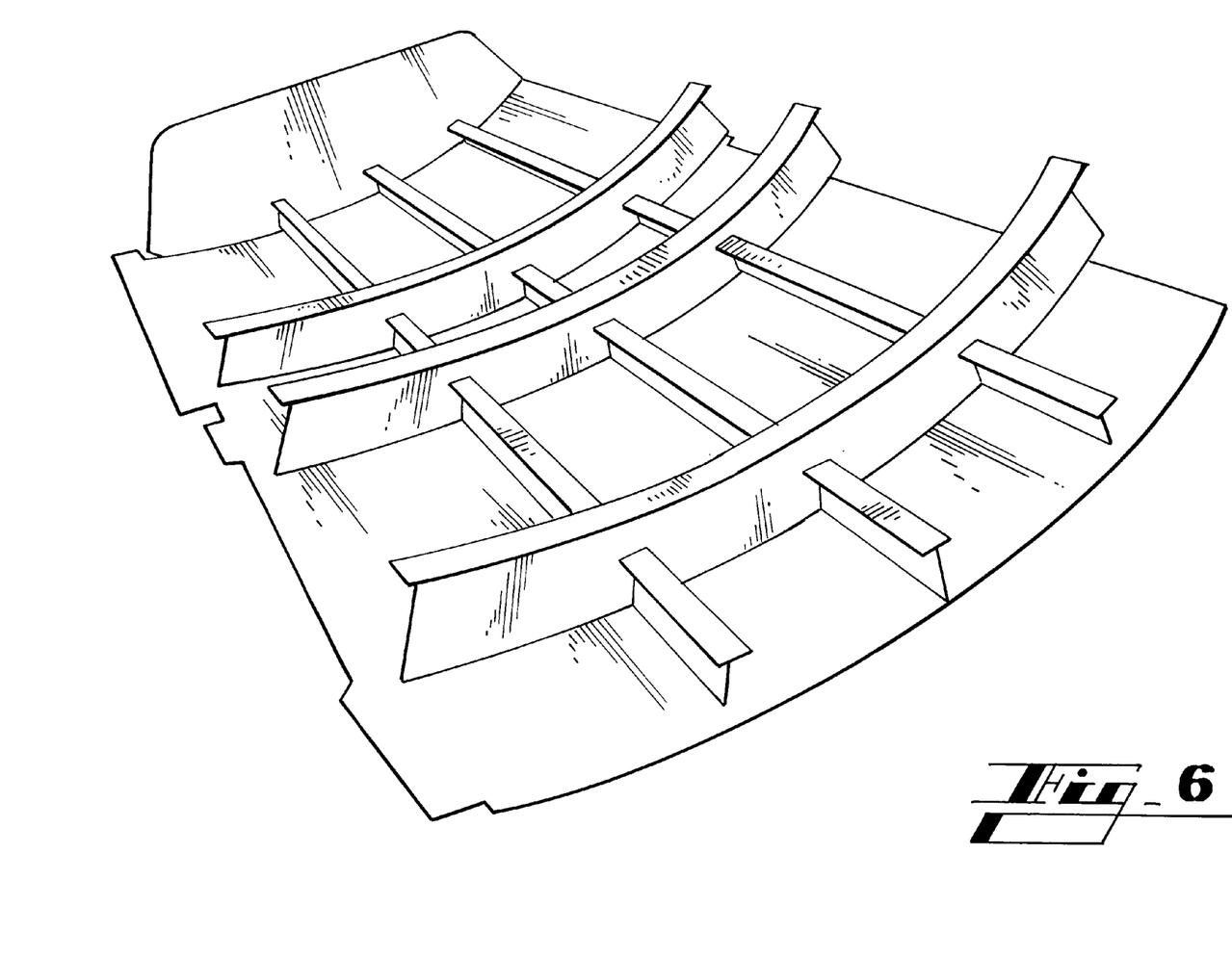
FIG. 6 illustrates the results of the identification of the components represented by the reflection points of FIG. 4.
Figure 7A:
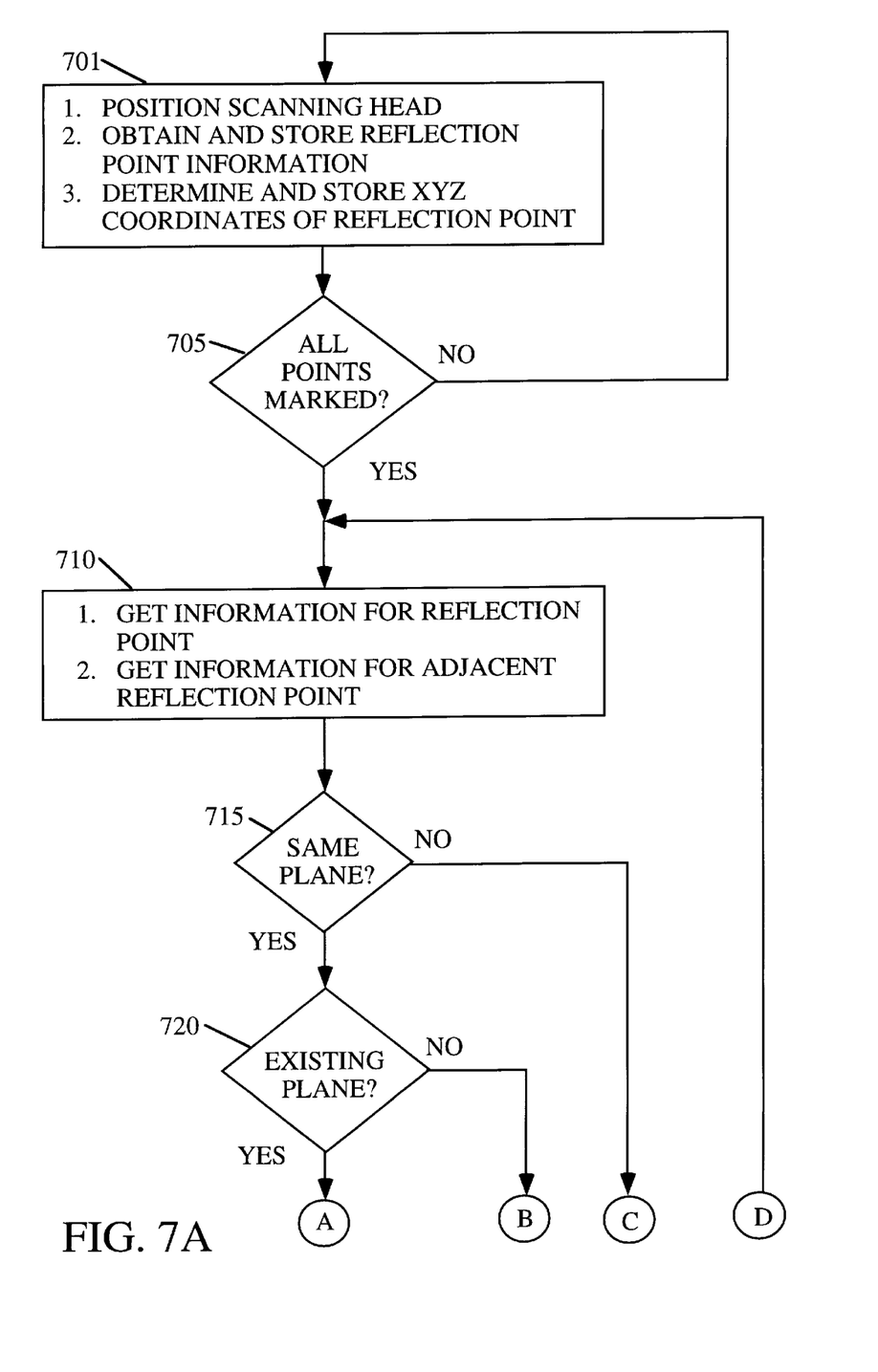
FIGS. 7A–7D are a flowchart of the data reduction operation.
Figure 7B:
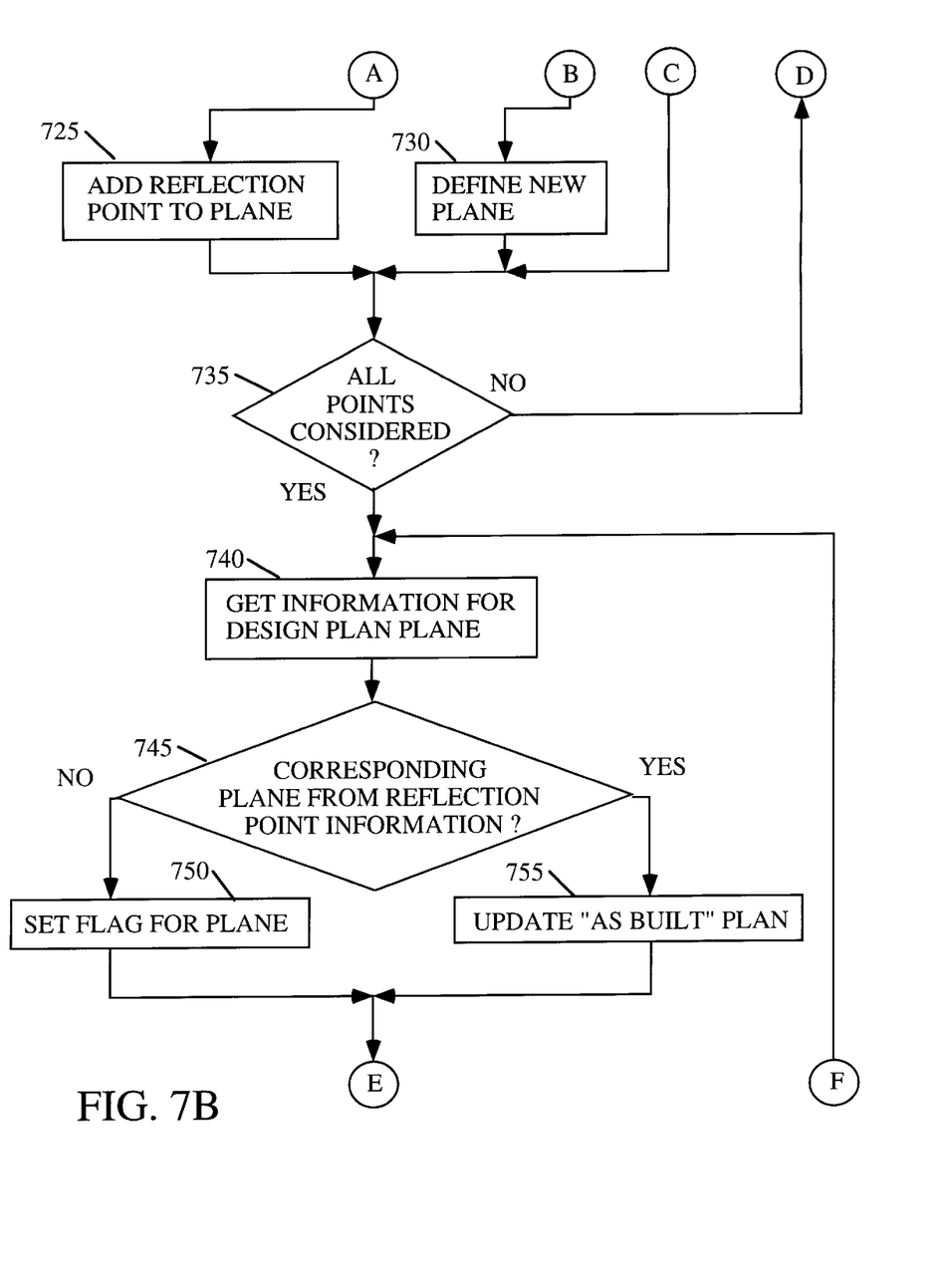
Figure 7C:
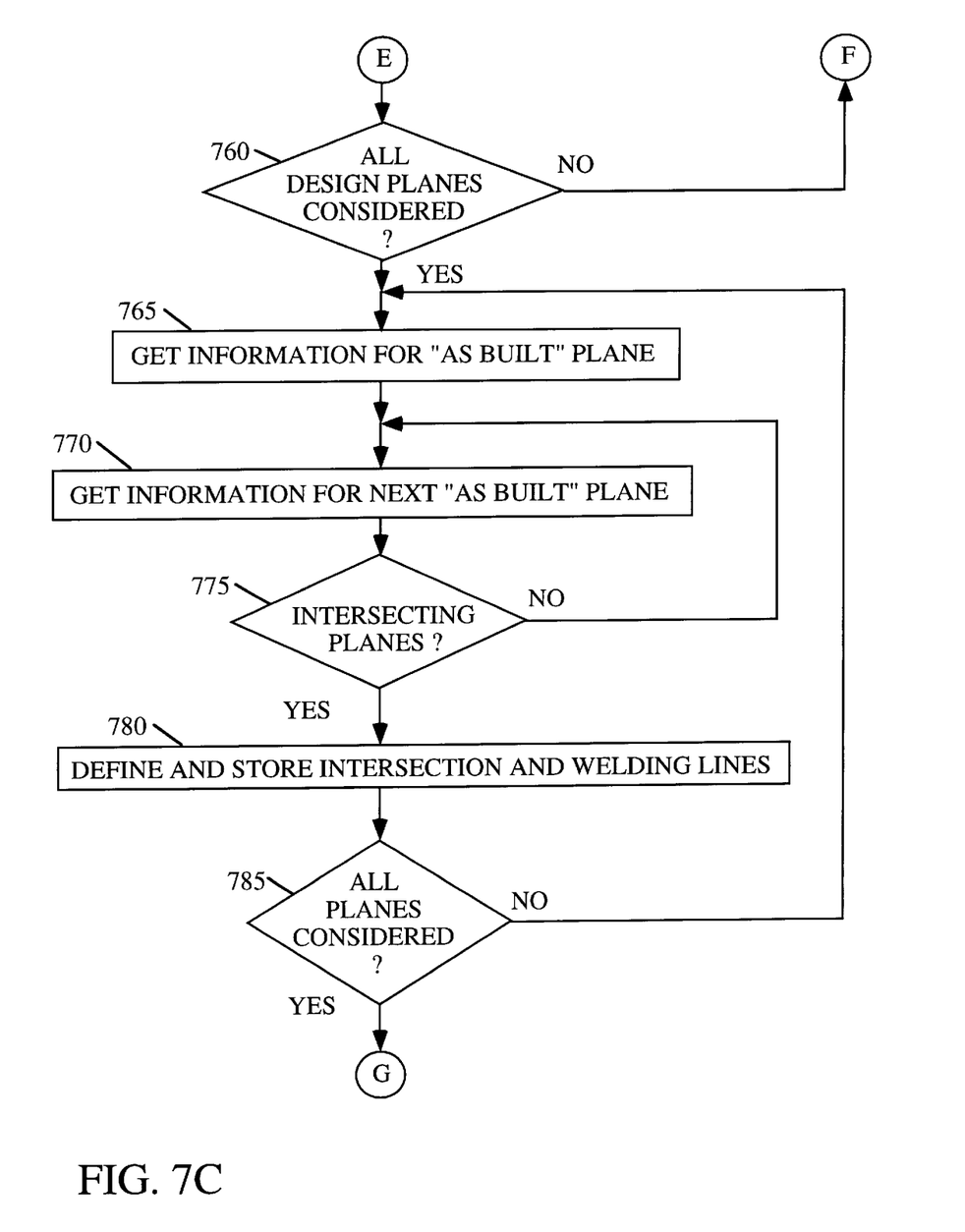
Figure 7D:
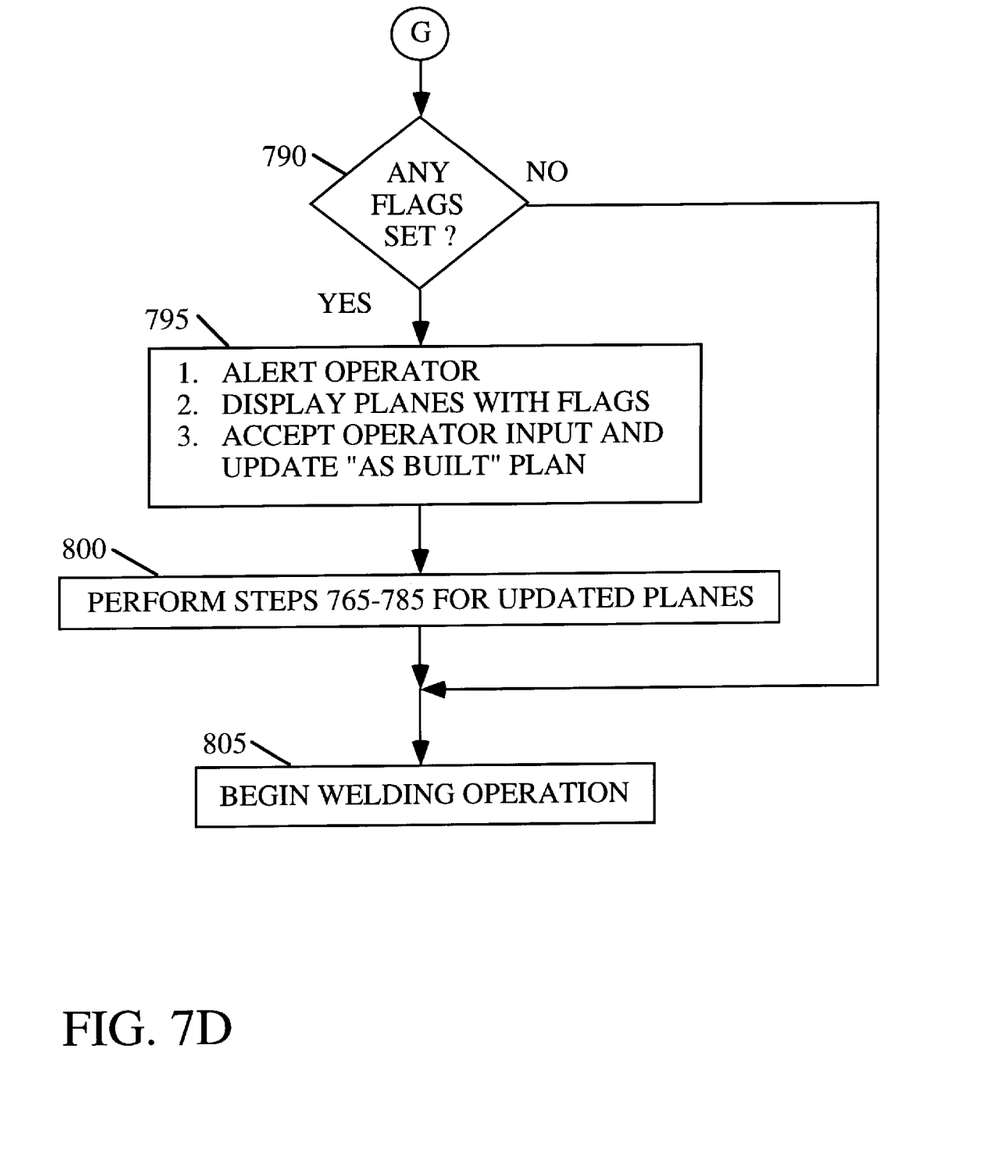

FIG. 6 illustrates the results of the identification of the components represented by the reflection points of FIG. 4. However, at this point, there has not been a determination whether the different planes represent different components or different surfaces (top, side) of the same component. To resolve this, information about the components is required. This may be in the form of human input whereby a human operator views the dislay and indicates surfaces which are part of the same component. In the preferred embodiment, the information is used to update the design workpiece plans. The design workpiece plans represent the ideal location of each of the components. However, the actual placement of the components is typically not exactly in accordance with the design workpiece plans. If the components are placed in accordance with the design workpiece plans, or closely thereto, the design workpiece plans will provide information which is sufficiently accurate to allow for the robotic welder to use the touch-sense feature to determine the exact intersection where the components are to be welded. However, if the parts are not placed sufficiently close to the design workpiece plans, then the touch-sense feature may not be usable. The present invention therefore uses the information derived from the reflection points to update the design workpiece plans to provide an "as built" workpiece plan. The "as built" workpiece plans then provide accurate information which allows the touch-sense feature to operate properly.

The design workpiece plans identify the individual components and also specify the preferred size, location and orientation of the individual components. The controller 20 uses this information to determine the surfaces of the individual components. The controller 20 then matches surfaces from the design workpiece plans to the surfaces determined by the reflection points to determine the "as built" locations of the components. This "as built" information is then used to update the design workpiece plans to identify the exact location of the components to provide the "as built" workpiece plan. The "as built" workpiece plan now contains exact information regarding the size, location and orientation of the individual components. The controller 20 then uses the "as built" workpiece plans to perform the specified welding operations.

The step size between the measurements in the scanning process determines the accuracy of the identification of the component surfaces and the size, location and orientation of the individual components. A smaller step size yields more accurate information but increases the scanning time, the amount of data that the controller 20 must process, and therefore the processing time to develop the "as built" workpiece plans. A larger step size decreases the amount of data that the controller 20 must process, and therefore the processing time to develop the "as built" workpiece plans, but also yields less accurate information regarding the accuracy of the identification of the component surfaces and the size, location and orientation of the individual components. Thus, a smaller step size leads to more accurate "as built" workpiece plans but delays the availability of the plans, and a larger step size leads to quicker availability of the "as built" workpiece plans, but the accuracy of the placement of the components suffers. In the preferred embodiment, the step size is 6 inch spacing between the points, and the distance from the laser head to the reflection point is measured with a precision of $\frac{1}{64}$ inch.

FIGS. 7A–7D are a flowchart of the data reduction operation whereby the information on the individual reflection points is used to determine the "as built" configuration of the workpiece. These steps are performed by the controller 20. Step 701 positions the scanning head 16, obtains and stores the reflection point information, determines the coordinates of the reflection point, and stores the coordinates of the reflection point. Step 705 tests whether information has been obtained for all of the desired reflection points. If not, then step 701 is repeated. If so, then step 710 is executed.

Step 710 retrieves the coordinate information for a reflection point and for an adjacent reflection point. Step 715 tests whether the reflection point and the adjacent reflection point are in the same plane. If not, then step 735 is executed. If so, then step 720 tests whether this plane is an existing, previously defined plane. If so, then step 725 adds this reflection point to the existing point. Then step 735 is performed. If, at step 720, this plane is not an existing plane, then in step 730 a new plane is defined. Then step 735 is executed.

Step 735 tests whether all reflection points have been considered. If not, then step 710 is executed. If so, then step 740 is executed.

At this point, the "as built" planes have been determined from the reflection point information. These planes may be presented to a human operator for matching to the planes in the design workpiece plans. However, in the preferred embodiment, this is performed automatically. Therefore, in step 740, the information for a plane is obtained from the design workpiece plans. Step 745 tests whether there is a corresponding plane based upon the reflection point information. This is done by, for example, comparing the size, orientation, and center point of planes from the design plans with the same information for planes from the reflection point information. The two planes which most closely match are defined as corresponding planes. The design workpiece plan is then updated, using the exact coordinates of the corresponding plane based upon the reflection point information, to generate an "as built" workpiece plan. Then step 760 is executed.

If, at step 745, there is no corresponding plane information then a flag is set for that plane which marks that plane for further inspection. Then step 760 is executed.

Step 760 tests whether all of the design planes have been tested. If not, then a return is made to step 740. If so, then step 765 is executed.

It should be appreciated for steps 740 through 760, that an alternative method is to test each plane defined from the reflection point information to determine if there is a corresponding plane in the design workpiece plan and, if not, to mark the unmatched plane from the reflection point information for further inspection. Also, these steps could also test to determine whether any plane in either group has not been matched and set a flag for any unmatched plane.

It should also be appreciated that the design workpiece plan may not be available for comparison with the measured information. In this case, steps 740–760 are omitted and the process jumps from step 735 to step 765 and continues using only the measured information.

Step 765 begins the process of using the "as built" workpiece plan information. In step 765 the information for an "as built" plane is obtained. Step 770 obtains the information for another "as built" plane. Step 775 tests whether the two planes are intersecting planes. If not, then step 770 is executed.

If so, then an intersection line is present at the junction of the two planes and step 780 defines and stores the intersection and welding lines. An intersection of two planes typically means the junction of two components which are two be welded together. Therefore, this intersection is defined as a welding line. If the welding line is a straight line then the two end points of the intersection are defined as the end points of the welding line. If either or both of the intersecting planes are curved then the intersection line generally will also be curved. Where there is a curved intersection line then the welding line is represented as a sequence of shorter, straight line segments, the straight line segments being defined as a series of points. Closer spacing of the points provides a more accurate curve but requires more time to calculate and to weld. More distance spacing of the points provides for a rougher curve, but speeds up the calculation process and the welding process. Thus, the spacing of the points is preferably a user-definable parameter and is based upon a tradeoff between the speed and smoothness. The spacing of points may be determined automatically by the controller based upon a user-specified parameter defining the maximum allowable error between the intersection line (the desired curve) and the welding line (the actual curve). The spacing may vary for different welding lines or the spacing may be the same for all welding lines. Thus, the user has the choice for the entire welding process to be smoother or faster.

In an alternative embodiment, the points for the intersection line are input to a curve-fitting program. The program uses the points on the intersection line to select a curve which most closely approximates the intersection line. The curve may be, for example, part of a circle, or part of a parabola. The radius, focal point, or other mathematical characteristics necessary to define the curve are then stored, along with the starting and ending points of the curve, as the definition for that intersection line. Points on the intersection line which deviate more than a user-specified amount from the selected curve may be ignored or may be used to set a flag to alert an operator to review the data to determine whether these deviant points indicate the presence of an unusual shape. The information for the curve is then used in the welding process.

Further, step 780 determines whether there are any other planes which cut across the intersection line. A plane which cuts across the intersection line indicates a member, such as a beam, which the robot cannot weld through. That is, the robot must stop welding when it reaches the member, and then can resume welding, if appropriate, on the other side of the member. Therefore, a plane which cuts across an intersection line defines a starting coordinate or an ending coordinate for that intersection line. Briefly stated, the conjunction of two planes defines a line, and the conjunction of three planes defines a starting or ending point on a line. If there are no planes which cut across the intersection line then the starting and ending coordinates of the intersection line are determined simply by the intersection of the two planes which creates the intersection line. Thus, one intersection line may form one, two or more welding lines, depending upon the number of crossing planes. This information (starting and ending coordinates) for each welding line, is then stored.

Step 785 tests whether all planes have been considered. Preferably, each plane is tested for an intersection with every other plane. If not, then step 765 is executed. If so, then step 790 is executed.

Step 790 tests whether any flags have been set. If not, then step 805 begins execution of the welding operation. Of course, it is also possible to store the information and begin the welding operation at a later time.

If, at step 790, it is determined that a flag has been set then step 795 alerts the operator that there is a condition requiring operator input, displays to the operator each of the planes which has a flag that is set, and accepts the operator input regarding each of these planes. Preferably, the operator will view each plane, find the corresponding plane, and designate that the two planes are corresponding planes. The controller will then use the operator designation to update the plane in the design workpiece plan according to the corresponding plane based upon the reflection point information to provide the "as built" workpiece plan. The flag is then cleared for each designated plane. The operator may also review and change any plane information which is incorrect.

Then, step 800 performs steps 765–785 for these planes which have had the flags cleared or the information changed. Finally, step 805 is executed.

In an alternative embodiment, such as where a single scanning head at a fixed location is used, the controller 20 does not determine planes but determines discontinuities between adjacent points. A discontinuity may indicate an intersection of two surfaces, such as a weld line, or may indicate an edge, such as the edge of a beam which edge does not contact another component. If the adjacent points are at approximately the same distance from the scanning head, then the discontinuity indicates an intersection, that is, a welding line. If adjacent points are at distinctly different distances, then the discontinuity indicates an edge. This distance difference is user selectable. If the difference selected is too large, for example, greater than the thickness of a plate on the workpiece, then the process will not be able to detect an edge where one plate overlaps another plate. However, if the difference selected is too small then a curved surface may cause the false detection of an edge. In the preferred embodiment, minimum and maximum differences are specified by the user. A discontinuity less than the minimum difference is ignored, and a discontinuity greater than the maximum difference is treated as an edge. A discontinuity between these points is treated as an intersection. Alternatively, a discontinuity between these points may be flagged for presentation to an operator and then the operator specifies the nature of the discontinuity. Alternatively, all discontinuities, or all edges, may be displayed for the operator to view and identify or confirm. This allows the operator to ensure that false edges are not present.

Also, in the case of a single, fixed scanning head, some welding lines may have portions obscured by other components in the line of sight. However, a break in what appears to be a welding line may also be caused by the presence of a component which actually causes two separate, distinct weld lines. Therefore, if there are two welding lines which appear to be part of a longer welding line, then these welding lines are flagged for presentation to an operator and then the operator specifies whether one or more welding lines are present. This determination is made by extending the welding lines toward each other until they meet and, if the angle between the two lines is less than a user-specified amount, then the two lines are deemed to be part of a single, longer welding line. This process is used on both straight welding lines and curved welding lines.

It will therefore be appreciated that the present invention has automatically scanned the workpiece, obtained information on the workpiece, updated the design workpiece plans to provide "as built" workpiece plans, and executed the specified welding operation according to the "as built" workpiece plans.

Although the present invention has been described with particularity with respect to its preferred environment, the present invention is not so limited. The present invention is also useful for other operations, such as cutting operations where elements are removed, and "pick and place" operations.

Also, although the present invention has been described with a single controller 20 performing the scanning operation, the data reduction operation, and welding operation, the present invention contemplates that different controllers may be used for these different operations.

It will be appreciated from the above that the present invention provides a method and an apparatus for automatically scanning a workpiece to provide information for performing welding and cutting operations on the workpiece.

From a reading of the description above of the preferred embodiment of the present invention, modifications and variations thereto may occur to those skilled in the art. Therefore, the scope of the present invention is to be limited only by the claims below.

I claim:

1. A method for providing an identification of the elements of an object for a welding process, comprising the steps of:

setting a scanning device to view a first position on said object;

causing said scanning device to scan said object from said first position to a second position to obtain distance measurements between said scanning device and a corresponding plurality of points on said object;

setting said scanning device to view a next position on said object;

causing said scanning device to scan said object from said next position to a subsequent position to obtain additional distance measurements between said scanning device and a next corresponding plurality of points on said object;

repeating said steps of setting said scanning device to view said next position and causing said scanning device to scan from said next position to said subsequent position to obtain additional distance measurements on said object until the desired portion of said object has been scanned;

processing said distance measurements and said additional distance measurements to identify said elements of said object and to generate an identification of said elements; and providing said identification of said elements to said welding process.

2. A method for providing an identification of the elements of an object for a welding process, comprising the steps of:

causing a scanning device to scan said object in a first manner to obtain a first plurality of distance measurements between said scanning device and a corresponding plurality of points on said object;

causing a scanning device to scan said object in a second manner to obtain a second plurality of distance measurements between said scanning device and said corresponding plurality of points on said object;

processing said first plurality of distance measurements and said second plurality of distance measurements to identify said elements of said object and to generate an identification of said elements; and providing said identification of said elements to said welding process.

3. A method for providing an identification of the elements of an object for a welding process, comprising the steps of:

causing a scanning device to scan said object in a linear manner to obtain a first plurality of distance measurements between said scanning device and a corresponding plurality of points on said object;

identifying areas of said object for which additional distance measurements are needed;

causing a scanning device to scan said areas to obtain said additional distance measurements;

processing said distance measurements and said additional distance measurements to identify said elements of said object and to generate an identification of said elements; and providing said identification of said elements to said welding process.

4. An apparatus for providing an identification of the elements of an object for a welding process, comprising:

scanning means for scanning said object to obtain a plurality of distance measurements between said scanning means and a corresponding plurality of points on said object;

first means for moving said scanning means along a first path to obtain a set of said distance measurements;

second means for moving said scanning means along a second path to obtain additional said distance measurements; and control means for controlling the operation of said scanning means, said first means, and said second means, for receiving said set of distance measurements and said additional distance measurements, for processing said set of distance measurements and said additional distance measurements to identify said elements of said object and to generate an identification of said elements, and for providing said identification of said elements to said welding process.

5. An apparatus for providing an identification of the elements of an object for a welding process, comprising:

scanning means for scanning said object to obtain a plurality of distance measurements between said scanning means and a corresponding plurality of points on said object;

first means for moving said scanning means along a first path;

second means for moving said scanning means along a second path; and control means for controlling the operation of said scanning means, said first means, and said second means, for receiving said distance measurements, for processing said distance measurements to determine areas of said object for which additional distance measurements are needed, for controlling the operation of said scanning means, said first means, and said second means to obtain said additional distance measurements, for processing said distance measurements and said additional distance measurements to identify said elements of said object and to generate an identification of said elements, and for providing said identification of said elements to said welding process.

6. An apparatus for providing an identification of the elements of an object for a welding process, comprising:

scanning means for scanning said object to obtain a plurality of distance measurements between said scanning means and a corresponding plurality of points on said object;

first means for moving said scanning means along a first linear path to obtain a set of said distance measurements;

second means for moving said scanning means along a second linear path orthogonal to said first linear path to obtain additional said distance measurements; and control means for controlling the operation of said scanning means, said first means, and said second means, for receiving said set of distance measurements and said additional distance measurements, for processing said set of distance measurements and said additional distance measurements to identify said elements of said object and to generate an identification of said elements, and for providing said identification of said elements to said welding process.

* * * * *